Patented Jan. 25, 1949

2,459,941

UNITED STATES PATENT OFFICE 2,459,941

ANTHRAQUINONE VAT DYESTUFFS

Theodor Holbro, Basel, Walter Kern, Sissach, and Paul Sutter, Basel, Switzerland, assignors to Ciba Limited, a Swiss firm No Drawing. Application June 2, 1944, Serial No. 538,540. In Switzerland June 24, 1943

4 Claims. (Cl. 260—368)

The present invention relates to vat dyestuffs of the anthraquinone series. More particularly it provides new dyestuffs of the said series containing two or more radicals of vattable compounds, e. g. anthraquinone radicals interconnected by carbonamide or related carbon-nitrogen linkages. Still more particularly the present invention is concerned with vat dyestuffs obtainable by condensing certain anthraquinone dicarboxylic acids with cyclic amines.

It is already known in the art to condense anthraquinone mono-carboxylic acids, including those containing further substituents, with various vattable amines, and some useful dyestuffs have been obtained thereby. However, the range of shades hitherto obtained with such dyestuffs is somewhat restricted especially as far as deep shades are concerned. It has also been proposed to prepare vat dyestuffs from anthraquinone 1,5-dicarboxylic acid and vattable amines in analogy to those made from non-vattable dicarboxylic acids such as terephthalic acid, etc. Whereas several non-vattable dicarboxylic acids, if condensed with relatively simple vattable amines, such as 1-aminoanthraquinone, 1-amino-4- or -5-benzoylaminoanthraquinone, etc. yield valuable dyestuffs of good affinity for cellulosic fibers, the corresponding dyestuffs made from anthraquinone-1,5-dicarboxylic acid show such a poor affinity for cellulosic fibers that in practice they cannot be used as vat dyestuffs.

It is an object of the present invention to show that there are other anthraquinone dicarboxylic acids, as hereinafter defined which, on condensation with amines, yield valuable vat dyestuffs of good to excellent affinity for cellulosic fibers. It is a further object of the present invention to provide new vat dyestuffs possessing violet to navy blue shades which are fast to water spotting. Further objects will appear as the specification proceeds.

According to the present invention valuable vat dyestuffs are obtained by causing anthraquinone carboxylic acids containing at least two carboxyl groups of which at least one group is in β-position, if desired in the form of their reactive derivatives, to react with amines of which at least one amine contains a radical consisting of at least two rings.

The anthraquinone carboxylic acids used as starting materials for the present process may contain more than two, preferably however two carboxyl groups which may be attached to the same ring or preferably to different rings of the anthraquinone nucleus. At least one carboxyl group, advantageously however both carboxyl groups are attached in a β-position, for example in positions 2:6 and 2:7. Besides the indicated carboxyl groups these anthraquinone carboxylic acids may contain still further substituents, preferably in α-positions of the anthraquinone nucleus, for example, halogen, alkoxy, nitro, and amino groups.

Valuable dyestuffs are obtained in many cases if at least one, preferably both α-positions adjacent to the carboxyl groups are occupied by amino groups. If the starting materials contain in the said positions substituents capable of being converted into an amino group, for example halogen or nitro groups, these substituents can be converted into amino groups in the finished dyestuff according to known methods. Additional substituents present in the said starting materials may occupy also other positions not vicinal to the carboxyl groups. Acridone, thioxanthone or pyridine rings may also be attached in orthoposition of the anthraquinone ring, provided that the anthraquinone structure of the starting materials is not affected thereby (carbonyl group in 9- and 10-position).

As examples of anthraquinone carboxylic acids which may serve as starting materials for the present process there may be named particularly anthraquinone-2:4-, -2:6- and -2:7-dicarboxylic acid, 1:5-dihalogenanthraquinone-2:6-dicarboxylic acids, 1-aminoanthraquinone-2:4-dicarboxylic acid, 1:5-dinitro- or diaminoanthraquinone-2:6-dicarboxylic acids, as well as compounds of the said kind containing further substituents for example in 4 and/or 8-position such as halogens, acylamino groups or alkoxy groups, further 1:8-dinitro- or diaminoanthraquinone-2:7-dicarboxylic acids.

According to the present process anthraquinone carboxylic acids of this kind are used for the reaction with amines, preferably in the form of their reactive functional derivatives, especially as acid halides (chlorides). The amines used for the reaction are applied preferably in such quantities that one amino group is apportioned to every carboxylic group present in the starting material. For the reaction with 1 mol. of a dicarboxylic acid there are thus appropriately used 2 mols. of different amines or of the same amine.

The above anthraquinone carboxylic acids are reacted according to the present process with amines which contain at least two, for example, condensed rings, preferably however three or more condensed rings. These rings may be of purely aromatic or also of heterocyclic character. In particular these amines can be colored themselves or possess fluorescent properties as is the case with many higher hydrocarbons. Valuable results are especially obtained when using for the reaction amines capable of being vatted. These may belong to the anthraquinone series and contain a higher condensed ring system. Among the amines of the anthraquinone series capable of being vatted there may be mentioned, besides 1-aminoanthraquinone and 2-aminoanthraquinone, especially 1-aminoanthraquinones which contain still further substituents, such as halogen atoms, for example chlorine, methoxy, arylamino or acylamino groups wherein the acyl radical can be derived from an aliphatic acid (e. g. acetic acid), an aromatic acid (e. g. benzoic acid and substituted benzoic acids) or a heterocyclic acid (e. g. pyridine carboxylic acid).

Among the higher condensed ring systems there come into consideration the products formed by condensing together several anthraquinone groupings, for example, aminodibenzathrones, aminoisodibenzanthrones and aminopyranthrones, or those obtained by condensing further rings onto an anthraquinone nucleus, for example aminoanthrapyrimidines, aminoanthrapyridones and aminoanthraquinone acridones.

In many cases it is of advantage to use such compounds capable of being vatted as contain for example in ortho-position to the amino group at least one substituent giving rise to the formation of a heterocyclic ring. Those substituents are for example the hydroxyl, mercapto, nitro or amino groups, as well as halogen atoms. Depending on the conditions of the experiments, the formation of azole rings viz. oxazole, thiazole and imidazole rings can be effected directly subsequently to the action of the carboxylic acids or their functional derivatives or, if necessary, in a further process according to known methods. The products thus obtained finally contain an azole ring, e. g. of the formula

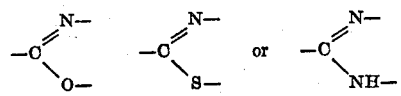

fused on to two ortho-positions of the amine component used and attached to the central anthraquinone nucleus of the acid component by means of a carbon-carbon linkage.

The reaction of the acids or their derivatives with the amines can be performed for example in indifferent dispersing agents or solvents, especially also in solvents or dispersing agents of high boiling point, such as chlorobenzene, dichlorobenzene and trichlorobenzene or nitrobenzene and advantageously at a raised temperature, for example at the boiling point. In certain cases it is possible to work also at room temperature or at an only slightly raised temperature. Acid binding agents or catalytically active agents can be used in known manner. Particularly the addition of tertiary bases, such as pyridine, has often proved advantageous. When using functional derivatives, especially the acid chlorides of di- and polycarboxylic acids, it is of advantage to work with such proportions that all carboxyl groups enter into reaction. Especially in this case it is possible to use for the reaction any other amines which are not capable of being vatted, besides the amines capable of being vatted.

The products obtained according to the present process can be further treated, for example, with halogenating agents and in may cases also with condensing agents.

The products obtained by the present process are vat dyestuffs and can be used in known manner for dyeing and printing the most various animal and especially vegetable fibers, such as wool, silk, leather and particularly cotton, linen, rayon and staple fiber of regenerated cellulose, as well as mixtures of the said fibers. They can also be converted in known manner into leuco ester salts, for example of sulfuric acid, and be used in this form for dyeing and printing according to processes usual for this dyestuff class.

The dyestuffs obtained according to the present process are partly of very good strength and permit inter alia the production of very different shades possessing good to excellent fastness properties.

The following examples illustrate the invention, the parts being by weight:

Example 1

16.7 parts of anthraquinone-2:6-dicarboxylic acid chloride obtainable for example from anthraquinone-2:6-dicarboxylic acid according to "Monatshefte," vol. 32, page 164, and 500 parts of dry ortho-dichlorobenzene are heated to 150–160° C. while stirring, and added at this temperature to a hot solution of 34.2 parts of 1-amino-5-benzoyl-aminoanthraquinone in 750 parts of ortho-dichlorobenzene. The dyestuff formation is complete after stirring for 2 hours at 150–160° C. The crystallized dyestuff is suction-filtered in the heat, washed with ortho-dichlorobenzene and alcohol and dried. The dyestuff of the formula

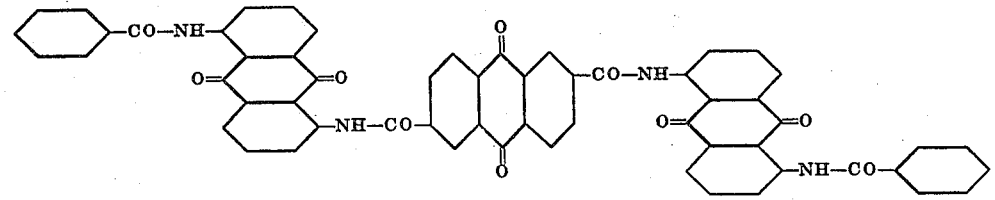

which is obtained in very good yield is a yellow crystalline powder which dissolves in concentrated sulfuric acid to a red solution and dyes cotton from a reddish olive vat yellow shades.

When replacing 1-amino-5-benzoylaminoanthraquinone by 1-amino-4-benzoylaminoanthraquinone there is obtained a red powder according to the same method of working which dissolves in concentrated sulfuric acid to a red solution and dyes cotton reddish orange shades from a black olive vat.

When using the corresponding quantity of 1-aminoanthraquinone instead of 1-amino-5-benzoylaminoanthraquinone there is obtained a yellow powder which dissolves in sulfuric acid to a reddish yellow solution and dyes cotton greenish yellow shades from an olive brown vat.

Example 2

If anthraquinone-2:7-dicarboxylic acid chloride (Cf. "Berichte," vol. 67, page 1748) is caused to react with 1-amino-5-benzoylamino-anthraquinone according to the method of working of Example 1, there is obtained a dyestuff which dyes cotton yellow shades from a violet brown vat. It dissolves in sulfuric acid to a red solution.

Example 3

18.8 parts of 1:5-dichloroanthraquinone-2:6-dicarboxylic acid, obtained by oxidation of 1:5-dichloro-2:6-dimethylanthraquinone with manganese dioxide in sulfuric acid of 80 per cent. strength at 80° C., are converted into the acid chloride by heating with 20 parts of thionyl chloride in 750 parts of dry ortho-dichlorobenzene. After distilling off the unconsumed thionylchloride, a hot solution of 34.2 parts of 1-amino-5-benzoylaminoanthraquinone in 350 parts of ortho-dichlorobenzene is allowed to flow to the acid chloride. The dyestuff formation is complete after stirring for 2 hours at 150–160° C. The dyestuff is suction-filtered in the heat, washed with dichlorobenzene and alcohol and dried. It is a reddish yellow powder of the formula

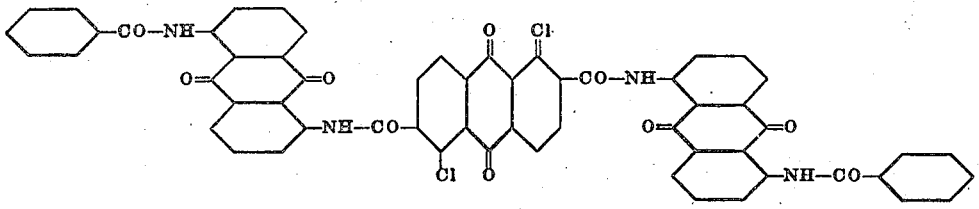

which dissolves in concentrated sulfuric acid to a red solution and dyes cotton reddish yellow shades from a red vat.

Example 4

To the solution of 17.1 parts of 1-amino-5-benzoylamino-anthraquinone in 500 parts of dry nitrobenzene there are added at 150–160° C. 10.6 parts of 1:5-dinitroanthraquinone-2:6-dicarboxylic acid chloride (produced by allowing thionylchloride to act on 1:5-dinitroanthraquinone-2:6-dicarboxylic acid in ortho-dichlorobenzene obtained itself by oxidation of 1:5-dinitro-2:6-dimethyl-anthraquinone with bichromate in sulfur acid). The dyestuff formation is complete after stirring for 2 hours at 150–160° C. The dyestuff is suction-filtered in the heat, washed with nitrobenzene and alcohol and dried. The resulting dyestuff of the formula

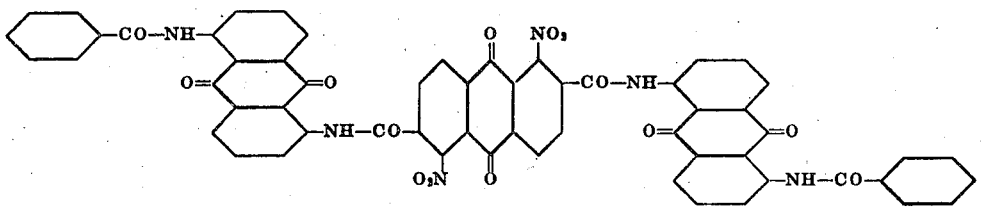

is a yellow powder dissolving in concentrated sulfuric acid to a red solution. It dyes cotton from a black olive vat in which the two nitro groups, are reduced to amino groups bluish red brown shades of very good properties of fastness.

The dyestuff can be reduced by re-vatting to the corresponding compound containing two amino groups also prior to dyeing. This compound is a red brown powder dissolving in concentrated sulfuric acid to a red solution which is changed to violet on addition of formaldehyde.

Example 5

By causing 1:5-dinitroanthraquinone-2:6-dicarboxylic acid chloride to react with the amines enumerated in the table below, there are obtained dyestuffs having the following properties when working according to the process described in Example 4:

|   | Amine | Dyestuff | | |
|---|---|---|---|---|
|   |   | Color in sulfuric acid | Color of the vat | Dyeing on cotton |
| a | 1-aminoanthraquinone | yellow | black olive | bordeaux. |
| b | 2-aminoanthraquinone | reddish yellow | yellow brown | bluish bordeaux. |
| c | 1-amino-4-benzoylaminoanthraquinone | red | black olive | blue bordeaux. |
| d | 1-amino-8-benzoylaminoanthraquinone | yellow | do | bluish red brown. |
| e | 1-amino-5-benzoyl-amino-8-methoxy-anthraquinone | bluish red | do | yellow bordeaux. |
| f | 1-amino-5-acetyl-aminoanthraquinone | reddish yellow | do | bluish red brown. |
| g | 1-amino-5-ortho'-chlorobenzoyl-aminoanthraquinone | do | do | Do. |
| h | 1-amino-5-meta'-chloro-benzoyl-aminoanthraquinone | do | do | Do. |
| i | 1-amino-5-para'-chloro-benzoyl-aminoanthraquinone | red | do | Do. |
| k | 1-amino-5-para'-methoxybenzoylamino-anthraquinone | red brown | do | bordeaux. |
| l | 1-amino-5-cinnamoyl-aminoanthraquinone | olive brown | do | bluish red brown. |
| m | 1-amino-4-methoxy-anthraquinone | red | do | bordeaux. |
| n | 1-amino-4-phenyl-aminoanthraquinone | dark red | black brown | bluish violet. |
| o | 1-amino-4-chloro-anthraquinone | yellow | black olive | bluish bordeaux. |
| p | 1-amino-5-chloroanthraquinone (mixture) | do | do | bordeaux. |
| q | 1-amino-6: 7-chloroanthraquinone (mixture) | reddish yellow | do | bluish bordeaux. |
| r | 4-aminoanthraquinone-2:1-(N)-1':2'-(N)-benzacridone | orange red | red violet | bluish violet. |
| s | 4-amino-4'-chloroanthraquinone-2:1-(N)-1':2'-(N)-benzacridone | do | do | Do. |
| t | 4-amino-5'-chloroanthraquinone-2:1'(N)-1':2'-(N)-benzacridone | do | violet | Do. |
| u | 4-amino-3':5'-dichloro-anthraquinone-2:1-(N)-1':2'-(N)-benzacridone | do | brown violet | Do. |
| v | 5-aminoanthraquinone-2:1-(N)-1':2'-(N)-benzacridone | orange | violet | bluish bordeaux. |

| | Amine | Dyestuff | | |
| --- | --- | --- | --- | --- |
| | | Color in sulfuric acid | Color of the vat | Dyeing on cotton |
| w | 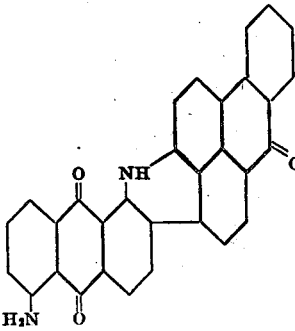 | green | blue grey | olive grey. |
| x | 1-amino-5-(β-pyridoylamino)-anthraquinone | reddish yellow | black olive | bluish red brown. |
| y | amino-chrysoquinone | violet | yellow olive | red-brown. |

Example 6

To the solution of 17.1 parts of 1-amino-5-benzoyl-amino-anthraquinone in 500 parts of dry ortho-dichlorobenzene there are added at 80–85° C. 9.1 parts of 1:5-diamino-anthraquinone-2:6-dicarboxylic acid chloride. After stirring for 2 hours at 80–85° C. the temperature is slowly raised to 150° C. In order to complete the dyestuff formation stirring is continued for 2 hours at 150–160° C., the whole is filtered in the heat, washed with ortho-dichlorobenzene and alcohol and dried. The red brown powder of the formula

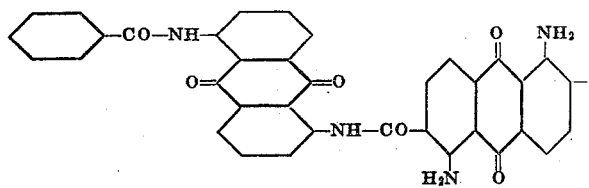

thus obtained dyes cotton bluish red brown shades from a black olive vat.

The acid chloride used in this example can be obtained as follows:

5 parts of 1:5-diaminoanthraquinone-2:6-dicarboxylic acid are ground with 60 parts of dry nitrobenzene. To the fine suspension there are added further 540 parts of nitrobenzene, 1 part of pyridine and 17 parts of thionylchloride and the mixture is heated for ¼ hour to 90–100° C. The 1:5-diaminoanthraquinone-2:6 dicarboxylic acid is dissolved thereby. Small quantities of impurities are removed by filtration and the filtrate is allowed to cool. The 1:5-diaminoanthraquinone-2:6-dicarboxylic acid chloride crystallizes in red brown needles having a greenish hue. It is filtered by suction, washed with acetone and water (in order to remove the hydrochloric pyridine) and dried in the exsiccator.

Example 7

To a solution of 17.1 parts of 1-amino-4-benzoylamino-anthraquinone in 500 parts of dry nitrobenzene there are added at 90–100° C. 9.1 parts of 1:5-diaminoanthraquinone-2:6-dicarboxylic acid chloride (cf. Example 6). The temperature is raised to 150° C. within ½ hour and the whole is stirred for 2 hours at 150–160° C. until the formation of dyestuff is complete. The dyestuff is filtered in the heat, washed with nitrobenzene and alcohol and dried. It is a dark red powder which dissolves in concentrated sulfuric acid to a red solution. It dyes cotton from a black olive vat a little purer and more bluish shades than the dyestuff described in Example 5c).

When replacing the 1-amino-4-benzoylamino-anthraquinone by other amines, there are obtained the following dyestuffs:

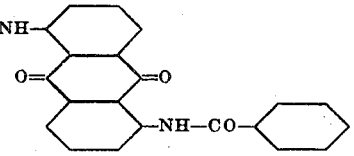

| | Amine | Dyestuff | | |
| --- | --- | --- | --- | --- |
| | | Color in sulfuric acid | Color of the vat | Dyeing on cotton |
| a | 1-amino-4-methoxy-anthraquinone | yellow red | black olive | bordeaux. |
| b | 1-amino-4-phenyl-aminoanthraquinone | green | black brown | bluish violet. |
| c | 4-aminoanthraquinone-2: 1-(N)-1': 2'-(N)-benzacridone | orange red | red violet | bluish violet. |
| d | 5-aminoanthraquinone-2: 1-(N)-1': 2'-(N)-benzacridone | orange | violet | bluish bordeaux. |
| e | 4-amino-(N)-methyl-1: 9-anthrapyridone | yellow | olive | bordeaux. |

Example 8

25.3 parts of the dyestuff obtained according to Example 3 are heated to boiling for 7 hours, while stirring, with 10.3 parts of para-toluene sulfamide, 5.9 parts of potassium acetate and 0.6 part of copper acetate in 200 parts of dry nitrobenzene. The solution is filtered after cooling, the residue is washed with alcohol, dilute hydrochloric acid and water and dried. In order to split off the toluene sulfonic acid groups, the reaction product thus obtained is introduced in 500 parts of concentrated sulfuric acid and stirred for 5 hours at 20° C. The red colored solution is poured onto ice, the precipitated dyestuff is filtered, washed with water and dried. It corresponds to the dyestuff obtained according to Example 4, 2nd paragraph.

Example 9

15 parts of the dyestuff obtained according to Example 4, paragraph 1, are suspended in 400 parts of nitrobenzene. Ammonia is introduced at 150–160° C., while stirring. The color of the dyestuff changes from yellow to red. The conversion is complete after two hours. The dyestuff, when cold, is suction-filtered, washed with nitrobenzene and alcohol and dried. It corresponds to the dyestuff obtained according to Example 4, paragraph 2.

which dissolves in sulfuric acid to a red solution and dyes cotton from a violet vat bluish violet shades.

The 1:8 - diaminoanthraquinone - 2:7 - dicarboxylic acid chloride used here can be prepared like the 1:5-diaminoanthraquinone - 2:6-dicarboxylic acid chloride described in Example 6.

Example 13

If 10.6 parts of 1:8-dinitroanthraquinone-2:7-dicarboxylic acid chloride are caused to react with 17.1 parts of 1-amino-4-benzoylaminoanthraquinone according to the process described in Example 4, there is obtained a bright red powder of the formula

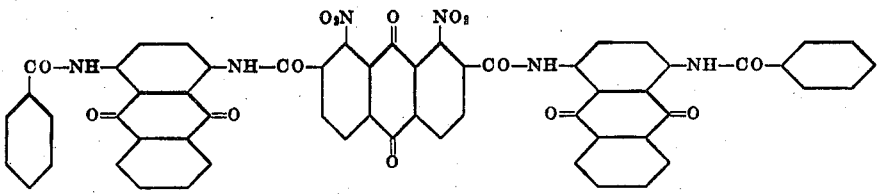

Instead of ammonia there can also be used substances giving off ammonia, for example, urea.

Example 10

To the solution of 17.1 parts of 1-amino-5-benzoylaminoanthraquinone in 500 parts of dry nitrobenzene there are added at 150–160° C. 10.6 parts of 1:5-dinitroanthraquinone-2:6-dicarboxylic acid chloride. After stirring for 2 hours at 150–160° C. a stream of ammonia is introduced into the reaction mixture for a further 2 hours. The red dyestuff thus formed is suction-filtered in the heat, washed with nitrobenzene and alcohol and dried. It corresponds to the dyestuff obtained according to Example 4, paragraph 2.

Example 11

When replacing the 1-amino-5-benzoylaminoanthraquinone in Example 10 by other amines, the dyestuffs enumerated in the table below are obtained:

which dissolves in concentrated sulfuric acid to a red solution and dyes cotton from a violet vat bluish violet shades.

The 1:8 - dinitroanthraquinone - 2:7 - dicarboxylic acid chloride can be prepared as follows: 7.7 parts of 1:8-dinitroanthraquinone-2:7-dicarboxylic acid (obtained by oxidation of 1:8-dinitro-2:7 - dimethylanthraquinone ["Berichte," vol. 63, page 1461] with bichromate in sulfuric acid) are heated to boiling in 385 parts of dry ortho-dichlorobenzene with an excess of thionylchloride until everything has dissolved. When cold the whole is allowed to stand for some time and the acid chloride obtained in pale, reddish yellow crystals is filtered off and washed with petroleum ether.

Example 14

8.6 parts of 1-amino-5-benzoylaminoanthraquinone, 9.1 parts of 1:5-diaminoanthraquinone-

| | Amine | Dyestuff | | |
|---|---|---|---|---|
| | | Color in sulfuric acid | Color of the vat | Dyeing on cotton |
| a | 5-amino-1:9-pyrazo-leanthrone | red | olive | bordeaux. |
| b | 4-amino-(N)-methyl-1:9-anthrapyridone | yellow | do | bluish bordeaux. |
| c | aminodibenzanthrone | violet | blue | green black. |
| d | aminoisodibenzanthrone | blue-green | do | navy blue. |
| e | aminopyranthrone | blue | red violet | blackish brown. |

Example 12

When replacing in Example 7 the 1:5-diaminoanthraquinone-2:6-dicarboxylic acid chloride by the same quantity of 1:8-diaminoanthraquinone-2:7-dicarboxylic acid chloride, there is obtained a dark powder of the formula 2:6-dicarboxylic acid chloride, 2.5 parts of pyridine and 600 parts of dry nitrobenzene are stirred together at 45–55° C. until all the starting material is reacted. The mixture is heated to 150° C., 10 parts of aniline are added and the whole is stirred for 2 hours at 150–160° C. until

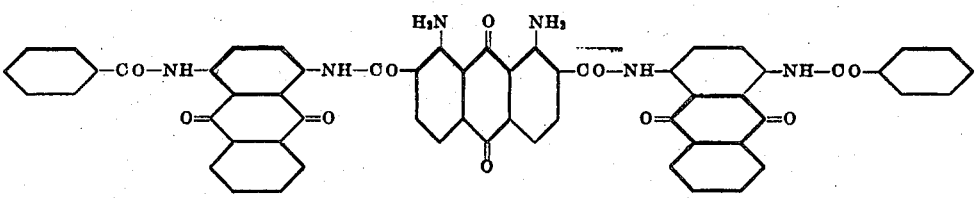

the formation of dyestuff is complete. The resulting dyestuff of the formula

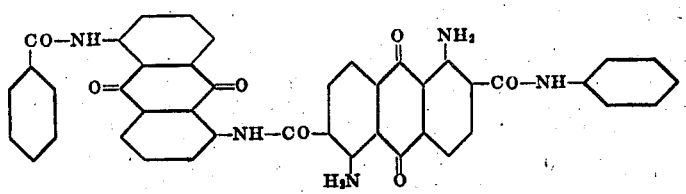

is suction-filtered in the heat, washed with nitrobenzene and alcohol and dried. It is a dark red brown powder which dissolves in concentrated sulfuric acid to a red brown solution and dyes cotton from an olive black vat bluish red brown shades.

Example 15

8.6 parts of 1-amino-5-benzoylaminoanthraquinone, 10.6 parts of 1:5-dinitroanthraquinone-2:6-dicarboxylic acid chloride, 2.5 parts of pyridine and 600 parts of dry nitrobenzene are stirred at 45–55° C. until all the starting material is reacted. The mixture is heated to 150° C., 5.5 parts of aminopyrene are added and the whole is stirred for 2 hours at 150–160° C. The resulting dyestuff of the formula

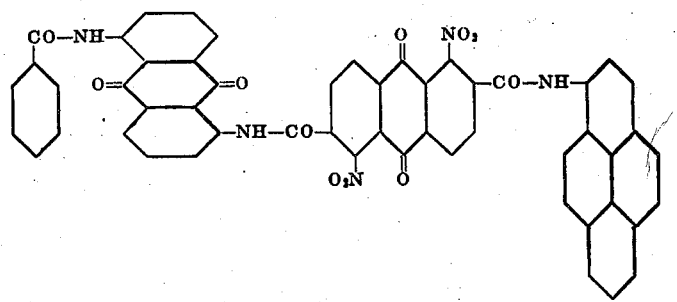

is suction-filtered in the heat, washed with nitrobenzene and alcohol and dried. It is an olive powder which dissolves in concentrated sulfuric acid to a brown solution and dyes cotton from a black olive vat bluish red brown shades.

Example 16

9.8 parts of 1:5-dimethoxyanthraquinone-2:6-dicarboxylic acid chloride are added to a solution of 17.1 parts of 1-amino-5-benzoylaminoanthraquinone in 500 parts of o-dichlorobenzene and 5 parts of pyridine at 150–160° C. After stirring 2 hours at this temperature the precipitated dyestuff is suction-filtered hot and washed first with o-dichlorobenzene and afterwards with alcohol. It is a reddish yellow powder dissolving in concentrated sulfuric acid with yellow red coloration which dyes cotton yellow from a violet brown vat. It corresponds to the formula

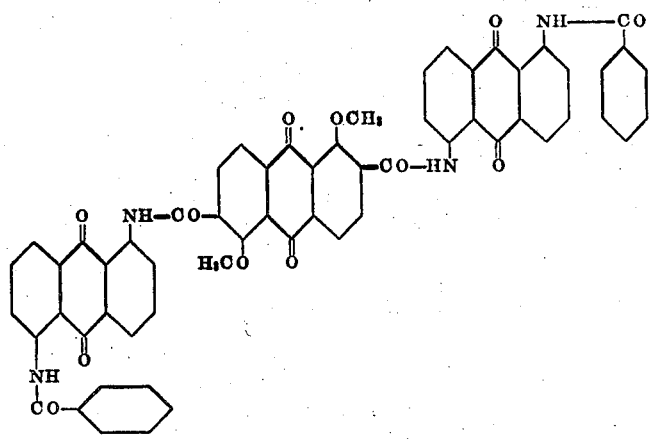

The dicarboxylic acid chloride used in this example can be prepared as follows:

38.6 parts of 1:5-dinitroanthraquinone-2:6-dicarboxylic acid are finely dispersed in 800 parts of methylol. After addition of 80 parts of potassium hydroxide the mixture is heated under reflux until a sample of the acid (after precipitation and drying) no longer gives a positive test for nitrogen. Water is then added and the whole is boiled with some charcoal and filtered, and from the filtrate the 1:5-dimethoxyanthraquinone-2:6-dicarboxylic acid is precipitated by addition of hydrochloric acid. After drying it is a yellow powder melting at about 300° C. For preparing the acid chloride 18 parts of the acid are heated with 36 parts of thionylchloride in 540 parts of o-dichlorobenzene and 4 parts of pyridine to 90–100° C. Within 5 minutes solution occurs. After cooling and standing for 24 hours the crystalline 1:5-dimethoxy-anthraquinone-2:6-dicarboxylic acid chloride is filtered off, washed with petroleum-ether and dried. It forms pale golden yellow needles which do not melt below 450° C.

Example 17

15.6 parts of 1-aminoanthraquinone-2:4-dicarboxylic acid are well-stirred with 20 parts of thionylchloride and 600 parts of dry nitrobenzene at 100–105° C. After ½ hour the acid chloride has been formed and the whole has gone into solution. For removing the excess of thionyl chloride and hydrochloric acid a current of dry air is passed through the mixture. Then 34.2 parts of 1-amino-5-benzoylaminoanthraquinone are added. After stirring for 2 hours the current of air is stopped and stirring continued for 2 hours at 150–160° C. The dyestuff is now suction-filtered hot, washed with nitrobenzene and alcohol and dried. It is a red brown powder of the formula

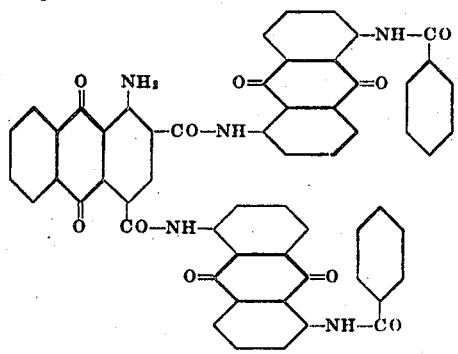

which dissolves in concentrated sulfuric acid with red brown coloration and dyes cotton yellow red shades from a red brown vat.

The dicarboxylic acid used in this example can be prepared as follows:

1-amino-4-bromoanthraquinone-2-carboxylic acid is reacted with CuCn in the presence of pyridine and nitrobenzene, according to the method described in German Patent 728,948 and the 1-amino-4-cyano-anthraquinone-2-carboxylic acid is saponified by means of sulfuric acid at 70 per cent. at about 150° C., thus yielding 1-aminoanthraquinone-2:4-dicarboxylic acid which is a red brown powder dissolving in concentrated sulfuric acid with brownish yellow color, which turns violet blue after addition of formaldehyde.

Example 18

11.9 parts of 2:3-diaminoanthraquinone are dispersed in 600 parts of nitrobenzene and heated to 150–160° C. 10.4 parts of 1:5-dinitroanthraquinone-2:6-dicarboxylic acid chloride are added and the whole is heated to the boil for two hours whilst stirring. After cooling down a little, the dyestuff is filtered still hot and washed with nitrobenzene and alcohol. After drying it is an olive powder of the formula

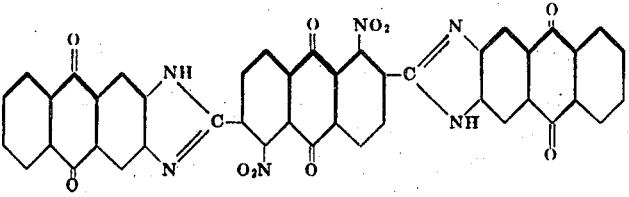

and dyes cotton from a yellow brown vat bordeaux shades.

Example 19

4.78 parts of 2-amino-3-hydroxyanthraquinone are suspended in 240 parts of dry nitrobenzene and mixed at 90–100° C. with 3.63 parts of 1:5-diaminoanthraquinone-2:6-dicarboxylic acid chloride. After adding 2 parts of paratoluenesulfonic acid the whole is heated to boiling in the course of 1 hour and boiling is continued until a test portion of the resulting dyestuff is no longer sensitive to alkalis. The dyestuff is then suction-filtered in the heat, washed with nitrobenzene and alcohol and dried. A dark powder of the formula

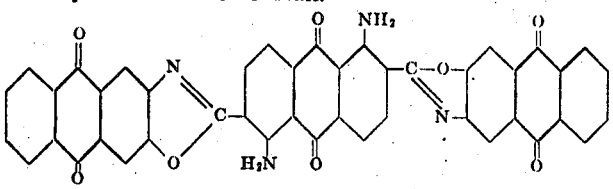

is thus obtained which dissolves in concentrated sulfuric acid to an olive solution and dyes cotton from a green vat violet shades.

This dyestuff can be produced also in two stages by performing the reaction of the 2-amino-3-hydroxyanthraquinone at a low temperature (for example 130° C.) and converting the intermediate product thus obtained which still contains two hydroxy groups into the dyestuff containing two oxazole rings by briefly heating in concentrated sulfuric acid to 110–120° C.

Example 20

12.8 parts of 1-mercapto-2-aminoanthraquinone are dispersed in 750 parts of trichlorobenzene and reacted at 90–100° C. with 8.3 parts of anthraquinone-2:6-dicarboxylic acid chloride. After two hours' stirring at the boil the formation of the dyestuff is complete. The dyestuff is suction-filtered hot, washed with trichlorobenzene and alcohol and dried. It corresponds to the formula

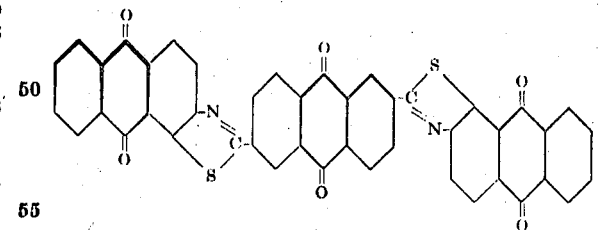

and can be purified as follows:

2.5 parts of finely powdered dyestuff are dispersed in 200 parts of water, 40 parts of 14 per cent. sodium hypochlorite solution are added and the whole is heated for 1 hour to boiling. The dyestuff thereby assumes a more yellow color. It is suction-filtered, washed and dried. It dyes cotton from a violet brown vat yellow shades.

Example 21

12.8 parts of 1-mercapto-2-aminoanthraquinone are suspended in 750 parts of trichlorobenzene and mixed at 150–160° C. with 10.6 parts of 1:5-dinitroanthraquinone-2:6-dicarboxylic acid chloride. The dyestuff formation is complete after stirring for 2 hours at the boiling point. The precipitated dyestuff is suction-filtered in the heat, washed with trichlorobenzene and alcohol and dried. It dissolves in concentrated sulfuric acid to a brown solution, dyes cotton from a violet brown vat violet brown shades and possesses the following constitution:

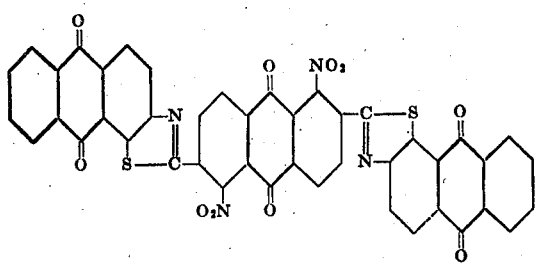

*Example 22*

15.1 parts of 2-amino-3-bromoanthraquinone are stirred with 300 parts of nitrobenzene at 100–105° C. A current of dry air is passed through this mixture and 9.1 parts of 1:5-diaminoanthraquinone-2:6-dicarboxylic acid chloride are added within ½ hour. After two hours stirring the current of air is stopped and stirring is continued for another 4 hours at 150–160° C. The resulting product is suction-filtered warm and washed with nitrobenzene and alcohol. It is a red powder dissolving in concentrated sulfuric acid with reddish yellow coloration and dyes cotton from an olive brown vat bluish bordeaux shades.

17.9 parts of this dyestuff, 256 parts of phenol, 34 parts of sodium sulfide and 45 parts of sulfur are heated together at 180° for 16 hours. After cooling down a little 600 parts of nitrobenzene are added with good stirring to the mixture. The precipitated dyestuff is suction-filtered, washed with nitrobenzene and alcohol and boiled with diluted caustic soda solution. It is a dark powder dissolving in concentrated sulfuric acid with brown color and dyes cotton from a green vat bluish violet shades. It corresponds to the formula

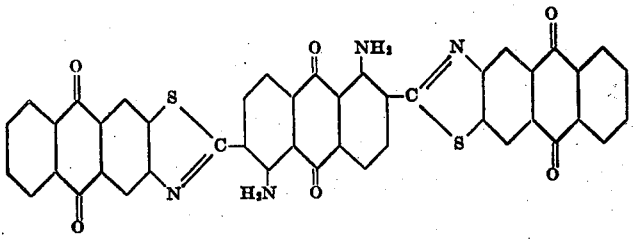

*Example 23*

To the solution of 18 parts of 1-aminoanthraquinone in 800 parts of dry nitrobenzene there are added at 90–100° C. 20.8 parts of 1:5-diamino-4:8-dibromoanthraquinone-2:6-dicarboxylic acid chloride. The temperature is raised to 150° C. and the whole is stirred for a further 2 hours at 150–160° C. The precipitated dyestuff is suction-filtered in the heat and washed with nitrobenzene and alcohol. It is a violet brown powder of the formula

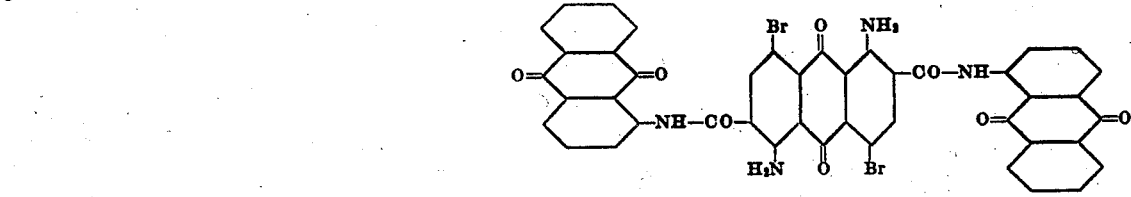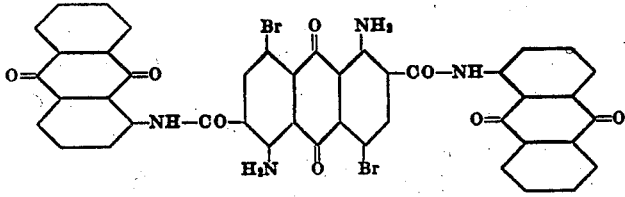

which dissolves in sulfuric acid to a yellow orange solution and dyes cotton from a black olive vat bordeaux colored shades.

The 1:5-diamino-4:8-dibromoanthraquinone-2:6-dicarboxylic acid chloride used in this example can be prepared as follows:

16.2 parts of bromine are added in drops within 10 minutes to the fine suspension of 16.3 parts of 1:5-diaminoanthraquinone-2:6 dicarboxylic acid in 200 parts of hydrochloric acid of 20 per cent. strength. The whole is stirred at 70–80° C. until the bromine has disappeared, diluted with water, the resulting 1:5-diamino-4:8-dibromoanthraquinone-2:6-dicarboxylic acid thus formed is filtered and washed with water. It is a dark, violet brown powder which dissolves in concentrated sulfuric acid to a yellow olive solution and in aqueous alkalies to a violet red solution. Its acid chloride can be prepared as follows: 4.84 parts of 1:5-diamino-4:8-dibromoanthraquinone-2:6 - dicarboxylic acid are stirred in 350 parts of trichlorobenzene with 1 part of pyridine and 48.4 parts of thionyl chloride at 90–100° C. until everything has dissolved. When cold the whole is allowed to stand for some time and the acid chloride obtained in the form of dark needles having a greenish hue is filtered off and washed with acetone and water.

*Example 24*

22.4 parts of the dyestuff from 1 mol. of 1:5-diamino-4:8-dibromoanthraquinone - 2:6 - dicarboxylic acid chloride and 2 mols. of 1-aminoanthraquinone described in Example 23, 17.1 parts of para-toluene-sulfamide, 9.8 parts of potassium acetate and 1 part of copper acetate are suspended in 300 parts of dry nitrobenzene and heated to boiling for 20 hours, while stirring. The reaction mixture is introduced into dilute hydrochloric acid and distilled with steam in order to remove the nitrobenzene. The residue of the distillation is filtered, washed with water and dried. It is introduced into 10 times the quantity of concentrated sulfuric acid and stirred at 20° C. until the saponification of the toluene sulfamide groups is complete. The dyestuff thus obtained is a dark powder which dissolves in sulfuric acid to an olive brown solution and dyes cotton from a violet brown vat olive grey shades. By benzoylating the two primary amino groups in the 4-, 8-position of this dyestuff with benzoyl chloride in nitrobenzene in the presence of pyridine at 135° C. there is obtained a dyestuff which dyes cotton from a violet brown vat grey shades.

standing thereto, and wherein each R stands for a radical of a vattable compound containing a single anthraquinone nucleus.

2. The dyestuff of the formula

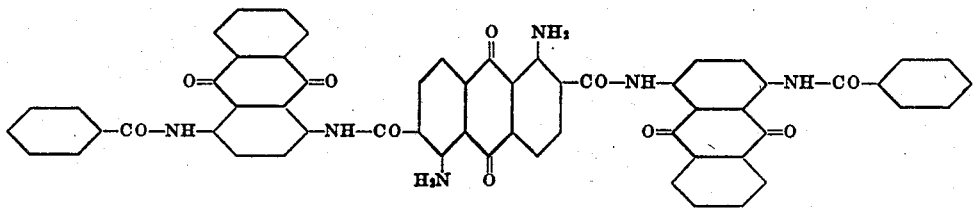

3. The dyestuff of the formula

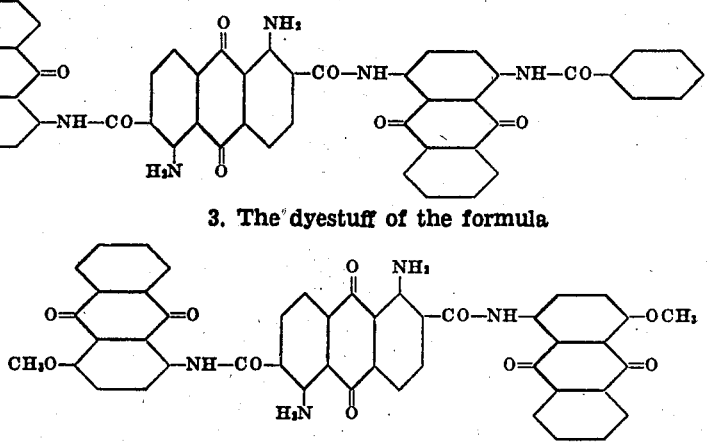

4. The dyestuff of the formula

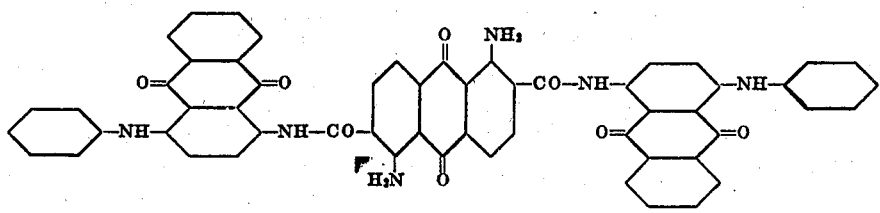

*Example 25*

1 part of the dyestuff obtained according to Example 4, paragraph 2 is vatted in the usual manner at 50–60° C. in 150 parts of water with addition of 4 parts of caustic soda solution of 36° Bé. and 2 parts of hydrosulfite. This stock vat is added to a dye-bath containing per 3000 parts of water 12 parts of caustic soda solution of 36° Bé, and 3 parts of hydrosulfite and 100 parts of cotton are introduced into the bath at 40° C. 30 parts of sodium chloride are added after ¼ hour and dyeing is continued at 40–50° C. during 1 hour. The cotton is centrifuged, oxidized in the air and finished as usual. There is obtained a bluish red brown dyeing.

It is to be understood that anthraquinone dicarboxylic acids and their derivatives containing the carboxyl groups in ortho-position to one another do not react in a proper way and therefore the appended claims should not be construed to include reactions or compounds made with such acids.

What we claim is:

1. Dyestuffs of the general formula

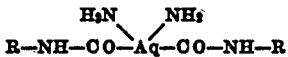

wherein Aq stands for an anthraquinone radical carrying both —CO—NH—R groups in β-position and both amino groups in α-positions ortho-

THEODOR HOLBRO.
WALTER KERN.
PAUL SUTTER.

REFERENCES CITED

The following references are of record in the file of this patent:

UNITED STATES PATENTS

| Number | Name | Date |
|---|---|---|
| 1,539,689 | Nawiasky et al. | Mar. 26, 1925 |
| 1,705,023 | Lulek | Mar. 12, 1929 |
| 1,877,884 | Kalischer et al. | Sept. 20, 1932 |
| 1,903,708 | Pongratz et al. | Apr. 11, 1933 |
| 1,934,771 | Rosenbach | Nov. 14, 1933 |
| 1,938,993 | Bayer | Dec. 12, 1933 |
| 2,001,737 | Lulek | May 21, 1935 |
| 2,001,738 | Lulek | May 21, 1935 |
| 2,045,304 | Lulek | June 23, 1936 |
| 2,049,189 | Beard | July 28, 1936 |
| 2,149,433 | Grossmann et al. | Mar. 7, 1939 |
| 2,233,496 | Stilmar | Mar. 4, 1941 |
| 2,335,698 | Rintelman | Nov. 30, 1943 |

FOREIGN PATENTS

| Number | Country | Date |
|---|---|---|
| 339,267 | Great Britain | Dec. 3, 1930 |